United States Patent

Shinskey

[15] 3,667,053
[45] May 30, 1972

[54] DIODE LAG CIRCUIT
[72] Inventor: Francis G. Shinskey, Foxboro, Mass.
[73] Assignee: The Foxboro Company, Foxboro, Mass.
[22] Filed: June 7, 1967
[21] Appl. No.: 644,219

[52] U.S. Cl............................328/55, 328/145, 328/177, 307/293
[51] Int. Cl............................H03k 5/159
[58] Field of Search..................307/229, 293; 328/145, 177, 328/55

[56] References Cited

UNITED STATES PATENTS

| 3,128,377 | 4/1964 | Goddard | 328/145 X |
|---|---|---|---|
| 3,369,128 | 2/1968 | Pearlman | 328/145 X |

*Primary Examiner*—Donald D. Forrer
*Attorney*—Lawrence H. Poeton

[57] ABSTRACT

It is found that the voltage drop across a diode is approximately proportional to the logarithm of the current therethrough; this relationship may be employed to generate a variable time constant lag when incorporated in the feedback circuit of a simple amplifier; distributed lags may be generated by employing a series of diodes in the feedback circuit.

4 Claims, 7 Drawing Figures

PATENTED MAY 30 1972  3,667,053

INVENTOR.
FRANCIS G. SHINSKEY

BY David E. Hoppe
ATTORNEY

INVENTOR.
FRANCIS G. SHINSKEY

BY David E. Hoppe

ATTORNEY

3,667,053

DIODE LAG CIRCUIT

This invention relates to variable time constant lag circuits and in particular to such lag circuits employing characteristics of diodes for generating desired lags.

In the industrial field, it is desirable to simulate each of the variable time constants of a process in order to effectively provide a model of the process for control or demonstration purposes. Conventionally, for simulating each variable time constant, a combination of a multiplier and integrator is used. Most single pass processes, such as once-through heat exchangers, require multiple or distributed lags for close simulation. Employing a combination of multiplier and integrator for each of the lags requiring simulation is both cumbersome and expensive.

Accordingly, the present invention directs itself to providing a variable time constant lag circuit employing the characteristics of a simple diode, and a circuit in which additional lags may be added by the simple addition of diodes and capacitors. Such a multiple-lag circuit may be readily constructed employing a minimum number of electrical components, and will adequately simulate complex once-through processes such as heat exchangers for control or demonstration purposes.

These and other advantages of the invention will be in part apparent from the specification herewith and in part from the figures in which.

It has been found that the voltage drop across a simple diode is approximately proportional to the logarithm of the current therethrough. Accordingly, the dynamic resistance of a diode is variable, and is approximately inversely proportional to the current through the diode. Using the diode as a resistance variable with current flow, in conjunction with a capacitor, it is possible to determine a time constant dependent upon the current flow. In order to generate a first-order lag whose time constant varies inversely with input signal voltage level, the invention employs two operational amplifiers. The first amplifier converts voltage to current, which current is then lagged, and the second operational amplifier translates the lagged current back to a voltage for application to the circuit output.

Figure 1:
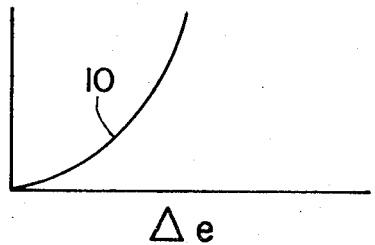
FIG. 1 is a plot of a diode voltage-current characteristic.
Figure 2:
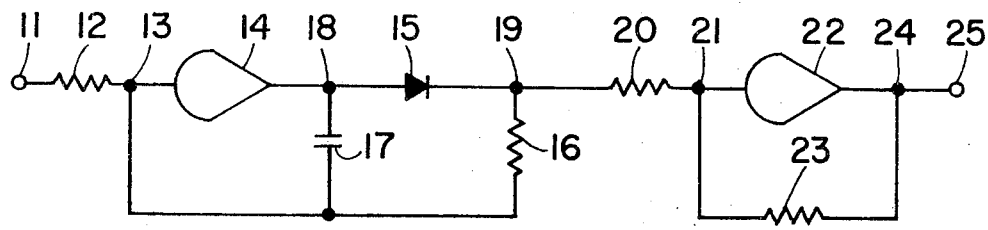
FIG. 2 is a schematic diagram of a single variable time constant lag circuit of the invention.

Referring to FIG. 2, a schematic of a circuit is illustrated for producing a simple first-order lag in which the time constant varies inversely proportional with the input signal voltage. Illustratively, for simulating the characteristics of a simple lagged system having only one variable time constant, a range of potentials to be applied to input terminal 11 is considered equivalent to a range of flow rates in the simulated system. Conveniently, then, 0 to 10 volts may represent the range of zero flow to full flow. Experiments with the flow system can determine a system time constant at some particular flow rate. In this flow system, it may be assumed that the time constant varies in proportion to the flow rate. Taking the experimentally-determined time constant as a reference, an input potential is selected corresponding to the experimental flow rate giving the observed time constant. For this particular potential, then, a time constant has been determined, and it is this time constant that the circuit of FIG. 2 is adjusted to exhibit upon the application of this particular potential to input terminal 11.

It is convenient to first consider the steady-state condition of the circuit of FIG. 2, in which the potential appearing at input terminal 11 is effectively duplicated at output terminal 25. In the steady-state condition, the amount of input current flowing through input resistor 12 is effectively determined by the potential at terminal 11 and the value of resistor 12, inasmuch as the other end of resistor 12 is connected to amplifier summing junction 13, which is held at a zero potential.

To hold summing junction 13 at zero potential, operational amplifier 14 must supply a feedback current from its output 18 through the series configuration of diode 15 and resistor 16 to summing junction 13. The level of current flowing through resistor 16 matches the current through input resistor 12 so that the potential at summing junction 13 may be zero.

In this manner, the value of input resistor 12 determines the feedback current from amplifier 14.

If input resistor 20 is matched to feedback resistor 16, half the current produced at output 18 of amplifier 14 is passed from junction 19 between diode 15 and resistor 16 through input resistor 20 to second amplifier 22, and the other half of the current from output 18 of amplifier 14 is passed through resistor 16 to summing junction 13; therefore the current through diode 15 is twice the current flowing through feedback resistor 16, input resistor 12 and input resistor 20.

Capacitor 17 is connected from output 18 to summing junction 13. Capacitor 17 is in parallel with the serial combination of diode 15 and resistor 16. Diode 15 is connected in a direction such that it is forward-biased by the polarity of the input signal, which is illustratively negative. The parallel legs provide a feedback circuit making amplifier 14 an integrator with a loop around it and in effect a first-order lag circuit, that is, an exponential delay circuit that has a steady state output at the last level achieved by an input signal. This circuit responds to either a positive-going or a negative-going step input at terminal 11, so long as the polarity of the step signal is appropriate to forward-bias diode 15.

Resistor 16 has a low value compared to the resistance of diode 15, so that the value of the diode variable resistance governs the functioning of the feedback loop, while resistor 16 generates a voltage proportional to the amount of current flowing therethrough for application through input resistor 20 of the second amplifier 22.

The time constant of the feedback circuit of amplifier 14 is determined by the value of capacitor 17 and the dynamic resistance of diode 15, plus the resistance of resistor 16. Resistor 16 is deliberately kept small so that the time constant of the feedback circuit will essentially be determined by the dynamic resistance of diode 15. That is, the time constant for charging and discharging capacitor 17 will be determined by the dynamic resistance of diode 15, which is inversely proportional to the current therethrough.

Inasmuch as current through resistor 12 is one-half the current through diode 15, current through the input resistor 12 thereby determines the initial time constant of the circuit. This current level flowing through diode 15, which is related to the steady-state potential at terminal 11, thereby determines the dynamic resistance for diode 15, effectively determining the level of variable time constant at which the circuit functions. When a step change occurs at input terminal 11, a current immediately flows from output 18 of amplifier 14, through capacitor 17, tending to keep the potential at output 18 constant. Gradually, capacitor 17 charges, thereby allowing a change in the potential at output 18, with a consequent change in potential across both legs of the feedback circuit comprising capacitor 17, and the serial configuration of diode 15 and resistor 16. The current flowing through capacitor 17 exponentially tapers off, and an increased current is transferred to the serial combination of diode 15 and resistor 16. The current finally achieved through diode 15 corresponds to the steady-state condition dictated by the new level of potential at terminal 11. Capacitor 17 effectively charges exponentially, toward the final value determined by the absolute level of input potential. When this level is reached, the distributed currents throughout the circuit of FIG. 2 stabilize in accordance with the new level of input potential at terminal 11, which potential is repeated at output terminal 25.

The voltage at junction 19 determines a proportionate amount of current to be supplied therefrom through input resistor 20 to summing junction 21 at the input of amplifier 22. Output 24 of amplifier 22 has a feedback loop connected back through resistor 23 to summing junction 21, and output 24 is also connected to circuit output 25 at which appears the function of the first order lag corresponding to the particular input applied to input terminal 11. The value of resistor 23 can be varied to change the ratio of input signal 11 to output signal 25 inasmuch as the ratio of resistor 20 to resistor 23 determines the output gain of amplifier 22. This value of resistor 23 is conveniently matched to the value of input resistor 12, while resistor 16 and resistor 20 are matched to each other, so that the input current flowing through resistor 12 will be the same as the output current flowing through resistor 23, and the output at terminal 25 in the steady-state condition duplicates the potential at input terminal 11.

Figure 3:
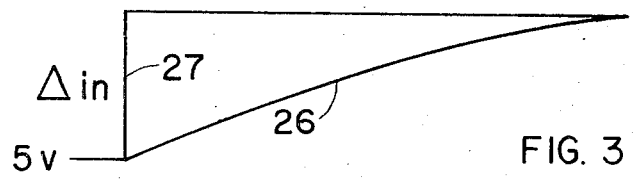
FIG. 3 is a plot of the step response of a single first-order lag with a time constant related to some particular low level of operation.
Figure 4:
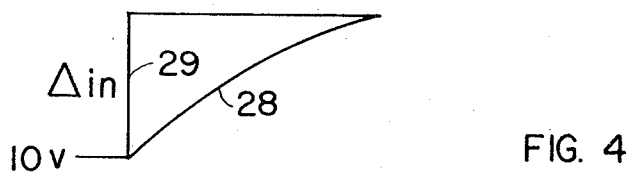
FIG. 4 is a plot of the step response of a single first-order lag with a time constant related to some particular high level of operation.

The lagged output appearing at terminal 25 of the circuit of FIG. 2 is illustrated in the plot of FIG. 3, wherein curve 26 represents a first-order lag consequent upon a small step input 27 to terminal 11 originating at 5 volts. Curve 28 of FIG. 4 illustrates a first-order lag consequent upon a similarly small step input 29 to terminal 11, but originating at 10 volts.

The time constant exhibited by the circuit of FIG. 2 reduces by one-half as between a step input 27 originating at 5 volts and a similar magnitude of step input 29 originating at 10 volts. That is, when the step input 29 has a base of 10 volts, the responsive lagged function 28 reaches a particular level in one-half the time that a lagged function 26 responding to a similar magnitude of step input 27 with a base of 5 volts reaches that same particular level.

Figure 5:
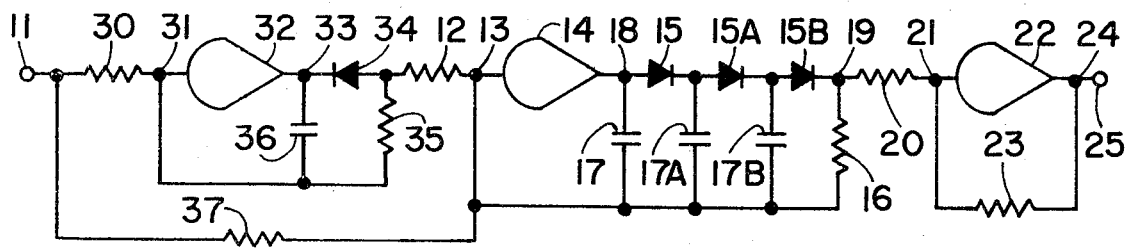
FIG. 5 is a circuit schematic of a distributed lag circuit having an additional phase-shifting dead-time circuit incorporated therewith.

Referring to FIG. 5, a combination of distributed lags are illustratively provided for by the addition of diodes 15a and 15b in series with diode 15 between amplifier 14 output 18 and junction 19, together with additional capacitors 17a and 17b connected from summing junction 13 to the anodes of respective diodes 15a and 15b. As many additional lags as may be required may be added in a similar manner. The distributed lag function achieved by this provision is suitable for simulating processes having distributed lags, such as heat exchangers, in which a stepped increase or decrease in heat affects the entire once-through flow line differentially with respect to the timing of the step change. In addition, in such processes it may be desirable to incorporate the simulation of a dead-time preceding the lag function, such provision being readily achieved by the addition of amplifier 32 together with associated circuitry to provide a phase-shifting function such as that more extensively described in U.S. Pat. No. 3,292,852 issued Dec. 20, 1966. The effect of the phase-shifting circuit upon the application of a stepped input signal at terminal 11 is to initiate a bias in an opposing direction to the lag function, which quickly reverses its direction and aids the lag generation, at which time the dead-time interval is determined and the lag function begins. The circuit of amplifier 32 is similar to that of the circuit of amplifier 14, with diode 34 in a reversed direction from that of diode 15, inasmuch as the signal is inverted at this point, with the additional corporation of resistor 37 connected from summing junction 13 back to input 11.

At the time a step signal is applied to input 11, resistor 37 couples this step to summing junction 13, immediately imposing a bias signal at summing junction 13 with a polarity opposite that needed for the requisite direction of distributed lagged function at output 25. At the same time, however, the phase-shifting circuit associated with amplifier 32 supplies a lag function to summing junction 13 with the correct polarity for making amplifier 14 produce the distributed lagged function at output 25.

When the lag output of amplifier 32 applied to summing junction 13 reaches a level sufficient to overcome the bias applied through resistor 37, the dead-time interval is effectively terminated, and amplifier 14 is allowed to initiate the distributed lag function appearing at output 25. Amplifier 14 effectively integrates the bipolar signal at its summing junction 13, so that the dead-time interval corresponds to an interval of no change in signal level at output 25.

At the termination of the dead-time interval, the potential at summing junction 13 exhibits a tendency to deviate in a direction opposite the direction of the step input through terminal 11. The feedback circuit of amplifier 14 includes diodes 15, 15a and 15b, in series between output 18 of amplifier 14 and junction 19, and capacitors 17, 17a and 17b, each one connected between summing junction 13 and the anode of its respective diode 15, 15a or 15b. Resistor 16 completes the feedback ladder network formed by diode 15, 15a and 15b, and capacitors 17, 17a and 17b.

The feedback circuit of amplifier 14 will supply current tending to keep the potential at summing junction 13 close to zero. Capacitor 17 is directly connected between output 18 at amplifier 14 and summing junction 13, and consequently begins to charge first in the ladder network, in response to a tendency for the input signal to deviate at summing junction 13. The current through capacitor 17 is initially relatively high, but as the charge begins to accumulate, diminishes. The changing level of charge appearing across capacitor 17 is applied to the configuration of diode 15 with the remainder of the feedback ladder network. Thereby, capacitor 17a begins to charge in response to the acquisition of charge by capacitor 17. Similarly, when capacitor 17a is charged sufficiently to acquire a change in potential, charging of capacitor 17b takes place in response thereto.

The time constant of the charging of the capacitors 17, 17a and 17b in the feedback network is affected by the level of current supplied through series diodes 15, 15a and 15b, which current level is equal to the sum of the currents through resistor 16 and resistor 20 as described above in connection with the circuit of FIG. 2.

By this series configuration of diodes 15, 15a and 15b together with capacitors 17, 17a and 17b, a distributed lag function is performed, and the output current of amplifier 14 flowing through input resistor 20 of amplifier 22 exhibits a distributed lag function following the dead-time interval provided by amplifier 32 together with its associated circuitry.

Figure 6:
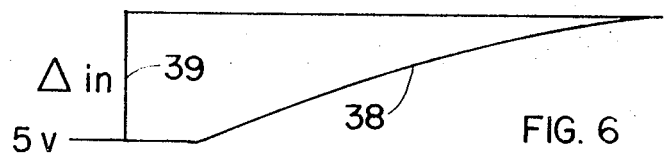
FIG. 6 is a plot of the step response of a distributed lag with a time constant related to some particular low level of operation.
Figure 7:
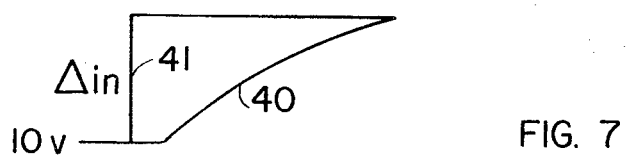
FIG. 7 is a plot of the step response of a distributed lag with a time constant related to some particular high level of operation.

Referring to FIG. 6, curve 38 is the distributed lag function appearing at output terminal 25 consequent upon a small step input 39, illustratively in the order of one-tenth to five-tenths of a volt, to terminal 11 originating at about a 5 volt operating level. The dead-time interval corresponds to the horizontal portion of curve 38 following step 39. FIG. 7 illustrates a distributed lag function 40 consequent upon a similarly small step input 41 to terminal 11, but the step input originating at approximately 10 volts, or twice the level from which curve 38 originated. When the operating level is doubled, as the operating level of FIG. 7 is twice that of the operating level of FIG. 6, the time constant reduces by one-half. That is, curve 40 rises twice as fast as curve 38, curve 38 distributed lag function time constant being twice that of the curve 40 distributed lag function. The dead-time interval portion of curve 38 is also twice the dead-time interval of curve 40. That is, the time constant of the dead-time interval similarly varies in proportion to the operating level of the simulated system.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A lag circuit for producing a lagged output function of an input signal variation applied thereto, comprising an amplifier having a summing junction at the input thereof, a feedback circuit responsive to the output of said amplifier and interconnected with said summing junction including first and second legs with said first leg being a capacitive leg and with said second leg having a diode serially disposed with a resistance therein whereby the time constant of said feedback circuit is determined by the capacitance of said first leg and the dynamic resistance of said diode and said resistance of said second leg so that the charging of said first leg is determined by the combination of said dynamic resistance of said diode and said resistance which dynamic resistance is inversely proportional to the current through said diode, and an output from said lag circuit taken from the junction of said diode and said resistance wherein said resistance generates a voltage proportional to the current therethrough to represent said lagged function.

2. The lag circuit of claim 1 with said feedback circuit including additional legs formed by a plurality of diodes serially interconnected in said feedback circuit with a plurality of capacitive means interconnected in said feedback circuit, with a first one of said capacitive means interconnected between the output of said amplifier and said summing junction such first one corresponding to said first leg, and each of the added said capacitive means being interconnected between a respective circuit connection of two of said serially interconnected diodes and said summing junction, and with a resistance serially disposed with said serially interconnected diodes to develop a potential thereacross proportional to the distributed lag function effected by said diode-capacitive ladder network, whereby the diode-capacitive ladder network formed thereby effects a distributed lag function of said input signal variation.

3. The lag circuit of claim 1 with phase-shifting means at the input circuit of said amplifier, whereby a dead-time interval is provided between the application of said input signal variation and the beginning of the lag function appearing at the output of said lag circuit.

4. The lag circuit of claim 1 with a second amplifier responsive to said output at the junction of said diode and said resistance for providing a voltage signal from said second amplifier.

* * * * *